May 29, 1934.  G. F. TAUCHMANN  1,960,291

APPARATUS FOR GRINDING REFLECTORS

Filed July 17, 1933

INVENTOR.
George F. Tauchmann
BY
ATTORNEY.

Patented May 29, 1934

1,960,291

UNITED STATES PATENT OFFICE 1,960,291

APPARATUS FOR GRINDING REFLECTORS

George F. Tauchmann, Berkeley, Calif.

Application July 17, 1933, Serial No. 680,815

2 Claims. (Cl. 51—54)

This invention relates to the art of abrading and particularly to the abrasion of glass to form spherical surfaces. More particularly, the invention relates to the formation of telescope reflectors of large diameter, usually upward of twenty inches.

Present practice of grinding a concave surface for a large reflector includes the rotation of the glass blank and the manipulation over the face of the blank of a heavy tool, usually a cast iron block machined to have a desired curvature. In forming a true surface as many as three blocks of different sizes may be required. This makes the manufacture of these reflectors expensive; in addition, close, true grinding is not secured.

The present invention obviates many difficulties including those involved in the use of the heavy cast iron blocks and the possibility of inaccuracy in grinding. In addition, I provide a machine which can be readily adapted to the grinding of any surface of a desired spherical contour, and this without any heavy and special machine work.

It is in general the principal object of the present invention to provide a simple but accurate machine for the grinding of spherical surfaces.

Another object of the invention is to provide for the grinding of telescope reflectors of large diameter in a novel manner. As is well known and appreciated, these are concave and must be ground extremely true to avoid aberration of the image. The present invention is of particular portent in this field.

The invention possesses numerous other advantageous features and objects, some of which, together with the foregoing, will be set forth at length in the following, wherein the preferred form of my invention is disclosed.

In the drawing accompanying and forming a part thereof,

Figure 1:
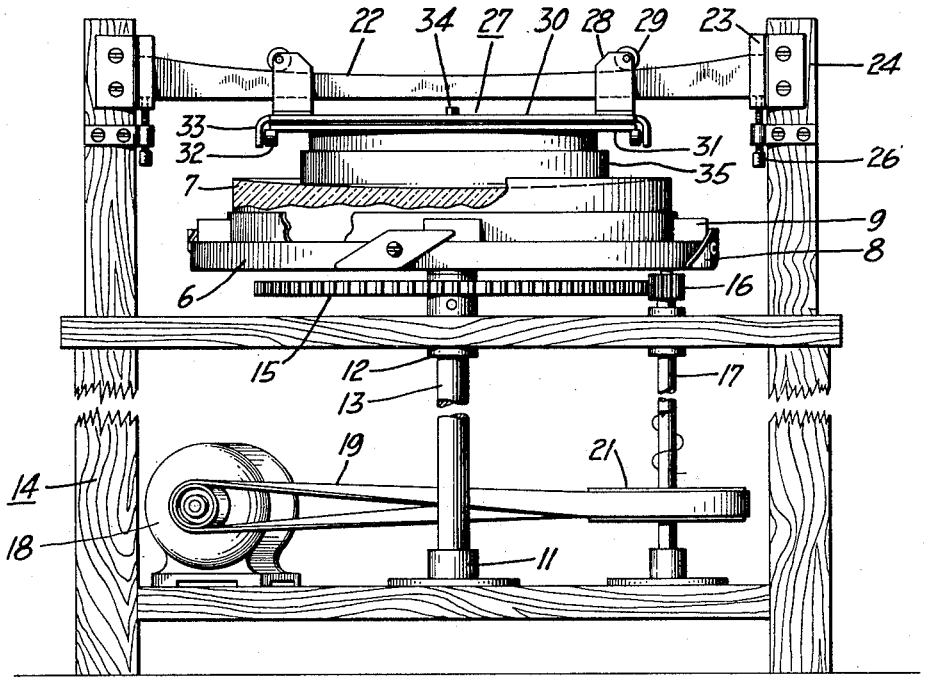
Figure 1 is a side elevation of a machine embodying features of my invention.
Figure 2:
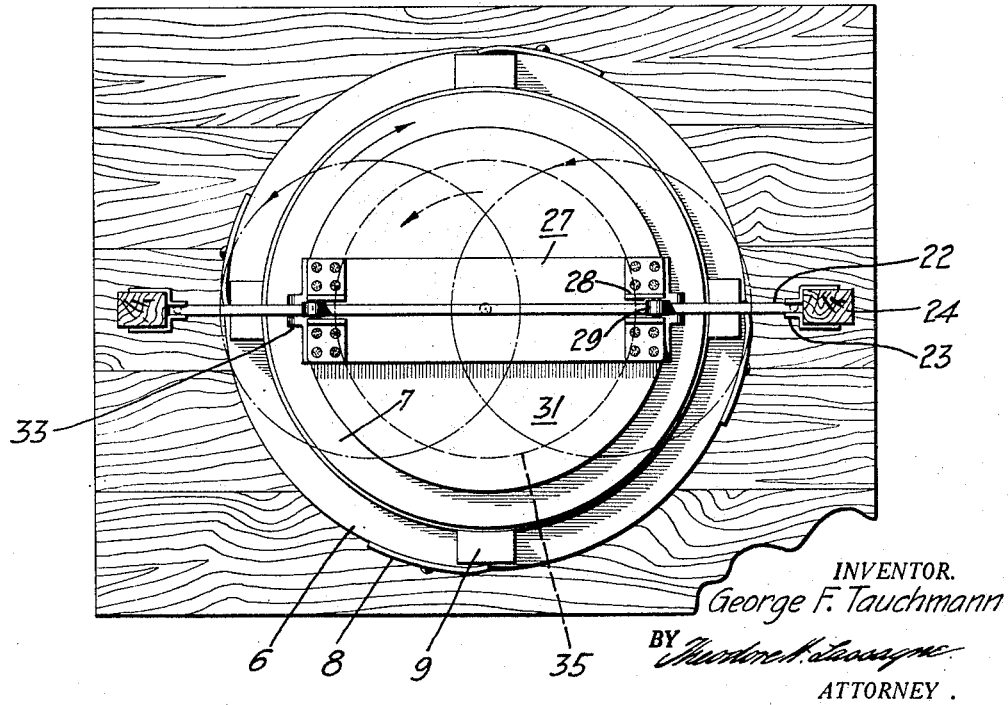
Figure 2 is a plan view.

In the preferred form of machines disclosed, I provide a rotatable carrier or turn table 6 upon which glass disc 7 and its support or mount are carried. Clamps 8 and blocks 9 secure the disc in a central position on the turn table during rotation. An end thrust bearing 11 and a bearing 12 support shaft 13 for rotation in a suitable frame or base structure indicated generally as 14. A gear 15 is carried on the shaft 13 and is driven by gear 16 on counter shaft 17. A motor 18 is connected by belt 19 to pulley 21 on the counter shaft to rotate the carrier table and the glass disc 7 thereon.

In accordance with this invention, the present practice of using machine formed heavy cast iron tools is obviated and other means for securing the desired spherical surface are provided. These include the track 22 supported in guides 23 on uprights 24 and extending across the disc to be ground. Screws 26 provide for vertical adjustment of the track.

From the track 22 is suspended a carriage 27 comprising suspension members 28 provided with rollers 29 adapted to roll upon the control surface of track 22 and connected together by a grinding tool support 30.

The grinding tool is rotatably supported in this carriage by a disc 31 adapted to rotate upon rollers 32 carried on downturned ears 33 of the support 30 and a pin 34 adapted to be received in a bearing formed in said support 30.

Rollers 32 are placed directly under the suspension members 28 to insure that the diameter of the tool in that direction will be maintained parallel to the track 22. Carried on the disc 31 is the grinding tool 35.

The grinding tool is preferably formed of some material which will wear away during the grinding operation as fast or slightly faster than the material of the blank, and glass has been found quite satisfactory for this purpose. The effect of this choice of material is to maintain the entire surface of the tool in contact with the blank throughout the grinding operation, producing a much more uniform result. Wear of the tool may be compensated for by adjustment of screws 26 to maintain the effective radius of the grinding surface substantially constant.

The contour of the track is readily arrived at. In forming a track having a circular guide surface, I have taken a bar of cold rolled steel, in one case a flat a quarter of an inch thick, two and one half inches wide and about three feet in length, and scribed thereon a segment of a circle. The radius of this circle is that of the curvature desired less the distance of the track from the surface of the tool. The bar is then sawed along this line and the two halves are filed smooth and are then lapped together. The positions of the two halves are reversed during the lapping so that a true continuous circular guide surface is secured on each. One half is convex and the other concave, the latter being shown in the drawing.

The grinding operation is begun, after the mirror blank and the track have been accurately levelled and the abrasive applied, by moving the grinding tool to a position where its edge slightly overlies the center of the blank. At this time the surfaces of both the tool and blank are substantially flat. Rotation of the turn table 6 is then commenced and the grinding tool is simultaneously rotated in the opposite direction by hand. This results in a spherical hollow being ground in the mirror blank while the grinding tool loses its square edge and assumes a complementary, convex form.

When the hollow of the blank has reached a substantial depth, the grinding tool is moved back and forth along the track, rotation of both the tool and blank being continued. This results in an extension of the central hollow of the blank toward its edges, until it is finally formed to a concave spherical surface.

It is to be understood that the embodiment disclosed is that at present preferred and that variations therein can be made without departing from my invention as it is defined in the claims.

I claim:

1. In a machine of the class described, a rotatable table having means for detachably securing a blank thereto, and means for supporting a grinding tool in cooperative relation with said table comprising a track concentric with the surface to be ground, a suspended carrier movable along said track, a tool rotatably mounted in said carrier, and means at the front and back of said carrier for preventing dipping of the edges of said tool as the carrier is moved along said track.

2. In a machine of the class described, a rotatable table having means for detachably securing a blank thereto, and means for supporting a grinding tool in cooperative relation with said table comprising a track concentric with the surface to be ground, a suspended carrier movable along said track, a tool rotatably mounted in said carrier, means at the front and back of said carrier for preventing dipping of the edges of said tool as the carrier is moved along said track, and means for adjusting the height of said track above said table.

GEORGE F. TAUCHMANN.